US011162013B2

(12) United States Patent
Sen

(10) Patent No.: US 11,162,013 B2
(45) Date of Patent: Nov. 2, 2021

(54) SET TIME CONTROL FOR LONG COLUMN CEMENT SLURRIES

(71) Applicant: Halliburton Energy Services, Inc., Houston, TX (US)

(72) Inventor: Tamal Kumar Sen, Kolkata (IN)

(73) Assignee: Halliburton Energy Services, Inc., Houston, TX (US)

( * ) Notice: Subject to any disclaimer, the term of this patent is extended or adjusted under 35 U.S.C. 154(b) by 261 days.

(21) Appl. No.: 16/465,950

(22) PCT Filed: Jul. 31, 2018

(86) PCT No.: PCT/US2018/044677
§ 371 (c)(1),
(2) Date: May 31, 2019

(87) PCT Pub. No.: WO2020/027816
PCT Pub. Date: Feb. 6, 2020

(65) Prior Publication Data
US 2021/0102111 A1 Apr. 8, 2021

(51) Int. Cl.
C09K 8/467 (2006.01)
C04B 22/08 (2006.01)
C04B 22/12 (2006.01)
C04B 28/04 (2006.01)
C04B 40/00 (2006.01)
C04B 103/22 (2006.01)

(52) U.S. Cl.
CPC ............ *C09K 8/467* (2013.01); *C04B 22/085* (2013.01); *C04B 22/124* (2013.01); *C04B 28/04* (2013.01); *C04B 40/0039* (2013.01); *C04B 2103/22* (2013.01)

(58) Field of Classification Search
CPC ..... C09K 8/467; C04B 22/085; C04B 22/124; C04B 28/04; C04B 40/0039; C04B 2103/22
See application file for complete search history.

(56) References Cited

U.S. PATENT DOCUMENTS

| 3,821,985 | A | 7/1974 | George |
| 6,660,078 | B2 | 12/2003 | Brothers et al. |
| 7,674,331 | B2 | 3/2010 | Drochon et al. |
| 2008/0182764 | A1* | 7/2008 | Xu .......................... C09K 8/467 507/269 |
| 2009/0194283 | A1 | 8/2009 | Ermel et al. |

(Continued)

FOREIGN PATENT DOCUMENTS

WO 2017078673 A1 5/2017

OTHER PUBLICATIONS

Omar S. Baghabra Al-Amoudi et al., Effectiveness of corrosion inhibitors in contaminated concrete, Elsevier, Cement & Concrete Composites 25 (2003) 439-449.

(Continued)

*Primary Examiner* — Crystal J Miller
(74) *Attorney, Agent, or Firm* — McAfee & Taft

(57) ABSTRACT

A method cementing a well is provided. The method includes the use of hydraulic cement composition that includes a set time control additive. The set time control additive includes a water soluble calcium salt such as calcium nitrate, a water soluble chloride salt such as sodium chloride, and a hydroxy carboxylic acid.

20 Claims, 3 Drawing Sheets

(56) References Cited

U.S. PATENT DOCUMENTS

| | | | |
|---|---|---|---|
| 2010/0240556 A1 | 9/2010 | Keys et al. | |
| 2014/0034312 A1* | 2/2014 | Schultz | E21B 33/14 |
| | | | 166/286 |
| 2014/0311387 A1* | 10/2014 | Hohn | C04B 28/02 |
| | | | 106/805 |
| 2016/0341022 A1* | 11/2016 | Fonseca Ocampos | |
| | | | C04B 28/04 |

OTHER PUBLICATIONS

Moradi, Sara et al., Engineered Cement Set Control Additive—Solution for a Long Standing Cementing Challenge, Society of Petroleum Engineers, SPE 101332, presented at the 2006 Abu Dhabi International Petroleum Exhibition and Conference held in Abu Dhabi, U.A.E., Nov. 5-8, 2006.

Sorgard, Eirik et al., Solution for a Long-Standing Cementing Challenge—Engineered Cement Set Control Additive, Society of Petroleum Engineers, SPE 106964, presented at Offshore Europe 2007 held in Aberdeen, Scotland, U.K., Sep. 4-7, 2007.

Pang, Xueyu et al., Nanosilicas as Accelerators in Oilwell Cementing at Low Temperatures, Society of Petroleum Engineers, IADC/SPE 168037, presented at the 2014 IADC/SPE Drilling Conference and Exhibition held in Fort Worth, Texas Mar. 4-6, 2014.

\* cited by examiner

Temperature Profile for UCA for Determining Strength Developments
for Cement Slurries at BHST and TOCT
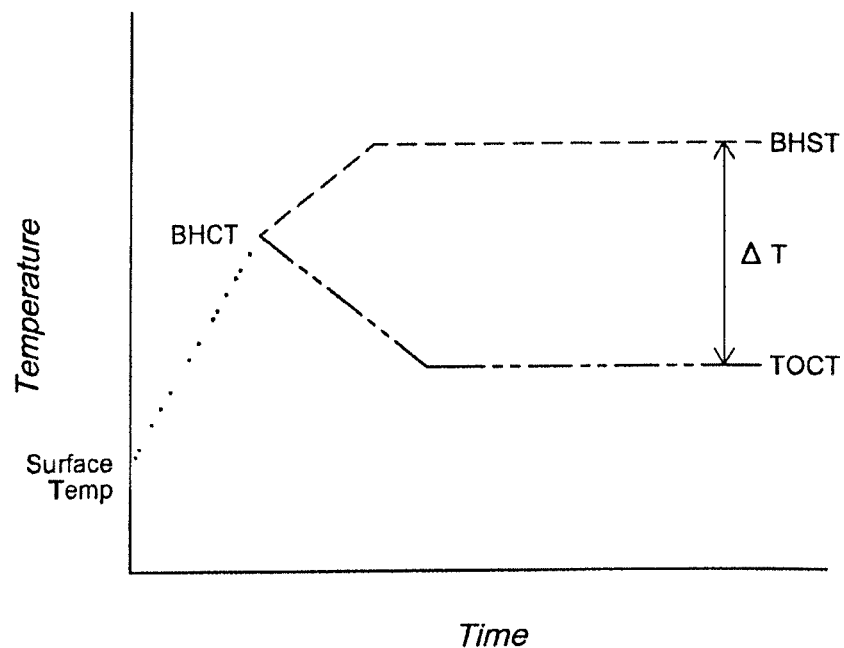
BHCT = Bottom Hole Circulaton Temperature
BHST = Bottom Hole Static Temperature
TOCT = Top of Cement Temperature
ΔT = Temperature Differential
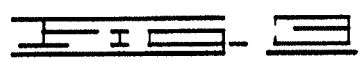

SET TIME CONTROL FOR LONG COLUMN CEMENT SLURRIES

BACKGROUND

Hydraulic cement compositions are commonly utilized in oil, gas and water well completion and remedial operations. A typical hydraulic cement composition is in the form of a slurry that includes hydraulic cement, water and one or more additives that affect one or more properties of the slurry such as the thickening time, compressive strength, set time, and rheology of the slurry. Hydraulic cement compositions are used in both primary cementing operations, and remedial or secondary cementing operations.

In a primary cementing operation, a hydraulic cement composition is pumped into the annular space between the walls of a wellbore and the exterior of a string of pipe such as a casing or liner disposed in the wellbore. The cement composition is permitted to set in the annular space thereby forming an annular sheath of hardened, substantially impermeable cement therein. The cement sheath physically supports and positions the pipe string in the wellbore and bonds the exterior surface of the pipe string to the walls of the wellbore, whereby undesirable migration of fluids between zones or formations penetrated by the wellbore is prevented.

For example, remedial or secondary cementing operations (collectively "remedial cementing operations") can be carried out to fix a problem in association with the cement or casing, including problems that develop over time. Examples of remedial cementing operations include squeeze cementing and plug cementing. For example, in a squeeze cement job, a cement composition is forced through holes or splits in the casing to repair a primary cement job or a well problem. In a plug cement job, a cement plug can be installed to plug a highly permeable zone or fracture in the well, plug cracks or holes in the casing, or address one or more other problems associated with the casing or well.

Once pumped into place, the cement composition must generally be allowed to develop sufficient mechanical strength or "set" before well operations can be resumed. If operations are resumed before the cement composition has set, the structural integrity of the cement can be compromised. In most applications, the time that it takes for a cement composition to set is costly well downtime. This downtime can range from a few hours to several days, depending on the difficulty and criticality of the particular cement job.

In both a primary and a remedial cementing operation, the hydraulic cement composition is designed to have a sufficient thickening time (the time that the composition remains in a fluid state and is capable of being pumped) with a reasonable set time (the time that it takes for the composition to set). In determining the thickening time and set time of a hydraulic cement composition, the anticipated temperature and pressure conditions associated with the well are assessed. The temperature conditions to be encountered by the cement composition are particularly important.

For example, as a general rule, the thickening time and set time of a hydraulic cement composition decreases as the temperature in the wellbore increases. The temperature in a wellbore generally tends to increase from the top of the wellbore to the bottom of the wellbore. As a result, in order to assure that the hydraulic cement composition will not become too thick before it can be put into place in the wellbore, and that the composition will set in a reasonable time, the temperature of the well at the lowest point in the well at which the cement composition will be placed, often the bottom hole static temperature (BHST), is generally used to calculate the desired thickening time and set time.

Designing a hydraulic cement composition that has a sufficient thickening time and reasonable set time can be difficult in connection with long column cement compositions that are to be put in place, for example, in a primary cementing application. In a long column cement composition, the temperature in the wellbore at the top of the cement column, the top of cement temperature (TOCT), can be much lower than the temperature at the bottom of the wellbore, for example, the bottom hole static temperature (BHST). As a result, the portion of the cement composition at the bottom of the cement column will thicken and develop strength and set much faster than the portion of the cement composition at the top of the cement column. The extent of the problem increases as the temperature differential ($\Delta T$) between the top of cement temperature (TOCT) and the bottom hole static temperature (BHST) increases. For example, it can sometimes take up to seven (7) days for the portions of the cement composition at the top of the column to set.

Thus, there is a need for hydraulic cement compositions and methods of cementing wells that allow for greater control over the set time of the cement compositions without significantly compromising the thickening time of the composition.

BRIEF DESCRIPTION OF THE DRAWINGS

The drawings included with this application illustrate certain aspects of the embodiments described herein. However, the drawings should not be viewed as an exclusive embodiment. The subject matter disclosed herein is capable of considerable modifications, alterations, combinations, and equivalents in form and function, as will be evident to those skilled in the art with the benefit of this disclosure.

FIG. 3 illustrated the temperature profile referenced in Example 4.

DETAILED DESCRIPTION

Figure 1:
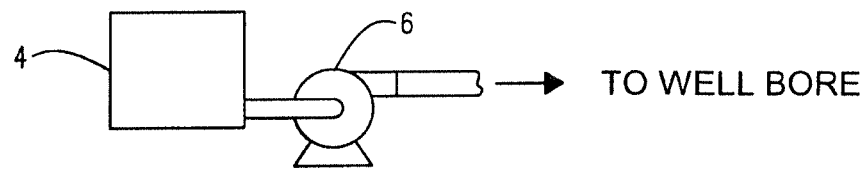
FIG. 1 illustrates a system for preparation and delivery of a cement composition to a wellbore in accordance with aspects of the present disclosure.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

In accordance with the present disclosure, a method of cementing a well is provided. Also provided are a hydraulic cement composition for use in a well, and a set time control additive for a hydraulic cement composition to be used in a well. As used herein and in the appended claims, a "well" means a wellbore extending into the ground and a subterranean formation penetrated by the wellbore. For example, a well can be an oil well, a natural gas well, a water well or any combination thereof. The phrase "cementing a well" includes both primary and remedial cementing operations. The phrase "cement composition" means a cement or cementitious composition and includes cement compositions in both fluid and slurry forms. The phrase "remedial cementing operations" includes secondary cementing operations.

The method of cementing a well disclosed herein comprises: (a) providing a hydraulic cement composition that includes a hydraulic cement, water, and a set time control additive; and (b) placing the cement composition in the well. For example, prior to (b) placing the cement composition in the well, well operations are ceased, and wherein the method further comprises: (c) allowing the cement composition to set before well operations are resumed. The set time control additive includes: (i) a water soluble calcium salt; (ii) a water soluble chloride salt; and (iii) a hydroxy carboxylic acid. As used herein and in the appended claims, "well operations" means operations carried out in the wellbore before and after the method of cementing is carried out.

As used herein and in the appended claims and as understood by those skilled in the art, the thickening time of a hydraulic cement composition means the time that the composition remains in a fluid state and is capable of being pumped. As understood by those skilled in the art, the set time of a hydraulic cement composition means the time that it takes for the composition to set. As understood by those skilled in the art, the term "set" means an increase in mechanical strength of a hydraulic cement composition sufficient to perform a desired result, such as to restrict movement of an item or impede fluid flow or pressure transfer through a fluid. In most instances, the cement composition may be referred to as set when it has cured to a fully solid composition. In some instances, the cement composition may be referred to as set when it can restrict the movement of a pipe, or impede fluid flow or pressure transfer, regardless of whether the cement composition has cured to a fully solid composition. In some instances, a fluid or slurry can be referred to as set when it has thickened to a sufficient level that it achieves the desired result, such as the isolation of a particular zone or the restriction of fluid flow or pressure transfer, regardless of whether it has reached its final consistency.

For example, the method disclosed herein can be a method of cementing a pipe string in a wellbore, and the cement composition can be placed in the well in a manner that forms a column of cement around the pipe string in the wellbore. For example, the method disclosed herein can be a primary cementing operation, and the pipe string can be a casing being cemented in place in the well. For example, the hydraulic cement composition can be provided by mixing the hydraulic cement composition, water and additive together, and the components of the additive can be blended together prior to mixing the additive with the hydraulic cement composition and the water.

The hydraulic cement of the hydraulic cement composition disclosed herein can include calcium, aluminum, silicon, oxygen, and/or sulfur that sets and hardens by reaction with the water. As used herein, the term "cement composition" encompasses pastes (or slurries), mortars, grouts (e.g., oil well cementing grouts), shotcrete, and concrete compositions including a hydraulic cement binder. The terms "paste," "mortar," and "concrete" are terms of art: "pastes" are mixtures composed of a hydratable (or hydraulic) cement binder (usually, but not exclusively, Portland cement, masonry cement, mortar cement, and/or gypsum, and may also include limestone, hydrated lime, fly ash, granulated blast furnace slag, and silica fume or other materials commonly included in such cements) and water; "mortars" are pastes additionally including fine aggregate (e.g., sand); and "concretes" are mortars additionally including coarse aggregate (e.g., crushed rock or gravel). The cement compositions described herein may be formed by mixing required amounts of certain materials (e.g., a hydraulic cement, water, and fine and/or coarse aggregate) as may be required for making a particular cementitious composition.

Examples of hydraulic cements may include, but are not limited to, Portland cements (e.g., Classes A, C, G, and H Portland cements), pozzolana cements, gypsum cements, phosphate cements, high alumina content cements, silica cements, high alkalinity cements, and combinations thereof. Cements including shale, cement kiln dust, or blast furnace slag also may be suitable for use in the some embodiments described herein. In certain embodiments, the shale may include vitrified shale. In certain other embodiments, the shale may include raw shale (e.g., unfired shale), or a mixture of raw shale and vitrified shale.

For example, the hydraulic cement of the hydraulic cement composition can be selected from the group of Portland cements, slag cements, pozzolana cements, gypsum cements, aluminon cements and silica cements. For example, the hydraulic cement of the hydraulic cement composition can be Portland cement. For example, the hydraulic cement of the hydraulic cement composition can be Class G Portland Cement.

For example, the water of the hydraulic cement composition can be selected from the group of fresh water, unsaturated salt solutions and saturated salt solutions. For example, the water of the hydraulic cement composition can be fresh water. For example, the water of the hydraulic cement composition can be present in the composition in an amount in the range of from about 10% by weight to about 400% by weight based on the weight of the hydraulic cement in the composition. For example, the water of the hydraulic cement composition can be present in the composition in an amount in the range of from about 60% by weight to about 250% by weight based on the weight of the hydraulic cement in the composition.

For example, the set time control additive can be present in the cement composition in an amount in the range of from about 2% by weight to about 100% by weight based on the weight of the hydraulic cement in the composition. For example, the set time control additive can be present in the cement composition in an amount in the range of from about 4% by weight to about 50% by weight based on the weight of the hydraulic cement in the composition. For example, the set time control additive can be present in the cement composition in an amount in the range of from about 10% by weight to about 40% by weight based on the weight of the hydraulic cement in the composition. For example, the set time control additive can be present in the cement composition in an amount in the range of from about 2% by weight to about 10% by weight based on the weight of the hydraulic cement in the composition.

For example, the water soluble calcium salt can be present in the hydraulic cement composition in an amount in the range of from about 1% by weight to about 20% by weight based on the weight of the hydraulic cement in the composition. For example, the water soluble calcium salt can be present in the hydraulic cement composition in an amount in the range of from about 2% by weight to about 20% by weight based on the weight of the hydraulic cement in the composition. For example, the water soluble calcium salt can be present in the hydraulic cement composition in an amount in the range of from about 3% by weight to about 10% by weight based on the weight of the hydraulic cement in the composition. For example, the water soluble calcium salt can be present in the hydraulic cement composition in an amount in the range of from about 3% by weight to about 4% by weight based on the weight of the hydraulic cement in the composition. For example, the water soluble calcium salt can be present in the set time control additive of the cement composition in an amount of about 4% by weight based on the weight of the hydraulic cement in the composition.

For example, the water soluble chloride salt can be present in the hydraulic cement composition in an amount in the range of from about 1% by weight to about 20% by weight based on the weight of the hydraulic cement in the composition. For example, the water soluble chloride salt can be present in the hydraulic cement composition in an amount in the range of from about 2% by weight to about 20% by weight based on the weight of the hydraulic cement in the composition. For example, the water soluble chloride salt can be present in the hydraulic cement composition in an amount in the range of from about 3% by weight to about 10% by weight based on the weight of the hydraulic cement in the composition. For example, the water soluble chloride salt can be present in the hydraulic cement composition in an amount in the range of from about 3% by weight to about 4% by weight based on the weight of the hydraulic cement in the composition. For example, the water soluble chloride salt can be present in the hydraulic cement composition in an amount of about 4% by weight based on the weight of the hydraulic cement in the composition.

For example, the hydroxy carboxylic acid can be present in the hydraulic cement composition in an amount in the range of from about 0.1% by weight to about 20% by weight based on the weight of the hydraulic cement in the composition. For example, the hydroxy carboxylic acid can be present in the hydraulic cement composition in an amount in the range of from about 0.1% by weight to about 4% by weight based on the weight of the hydraulic cement in the composition. For example, the hydroxy carboxylic acid can be present in the hydraulic cement composition in an amount in the range of from about 0.1% by weight to about 2% by weight based on the weight of the hydraulic cement in the composition. For example, the hydroxy carboxylic acid can be present in the set time control additive of the cement composition in an amount of about 0.3% by weight based on the weight of the hydraulic cement in the composition.

For example, the water soluble calcium salt can be selected from the group of calcium nitrate, calcium chloride, calcium bromide, and calcium chlorate. For example, the water soluble calcium salt can be calcium nitrate.

For example, the water soluble chloride salt can be selected from the group of sodium chloride, potassium chloride, cesium chloride, and magnesium chloride. For example, the water soluble chloride salt can be sodium chloride.

For example, the hydroxy carboxylic acid can be tartaric acid ($HOOC(CH_2O)_2COOH$).

For example, in one embodiment, the set time control additive of the hydraulic cement composition comprises in the range of from about 2% by weight to about 20% by weight of said calcium salt (for example, calcium nitrate), in the range of from about 2% by weight to about 20% by weight of said chloride salt (for example, sodium chloride), and in the range of from about 0.1% by weight to about 4% by weight of said hydroxy carboxylic acid (for example, tartaric acid), the weight percentages being based on the weight of the hydraulic cement in the composition. For example, in another embodiment, the set time control additive of the hydraulic cement composition comprises in the range of from about 3% by weight to about 10% by weight of said calcium salt (for example, calcium nitrate), in the range of from about 3% by weight to about 10% by weight of said chloride salt (for example, sodium chloride), and in the range of from about 0.1% by weight to about 2% by weight of said hydroxy carboxylic acid (for example, tartaric acid), the weight percentages being based on the weight of the hydraulic cement in the composition.

As understood by those skilled in the art with the benefit of this disclosure, additional components can also be included in the hydraulic cement composition disclosed herein, for example, oxidizing agents, solvents, strength stabilizing agents, fluid loss control additives, suspending aids, free-water control agents, additional retarders, additional accelerators, expansion additives, viscosifiers, gas migration additives and mechanical property enhancers.

The hydraulic cement composition of the present invention is the hydraulic cement composition used in the method described above.

The set time control additive for a hydraulic cement composition of the present invention is the set time control additive of the hydraulic cement composition used in the method described above.

For example, the calcium salt (for example, calcium nitrate) can be present in the set time control additive in an amount in the range of from about 1% by weight to about 20% by weight based on the total weight of the additive. For example, the calcium salt (for example, calcium nitrate) can be present in the set time control additive in an amount in the range of from about 2% by weight to about 20% by weight based on the total weight of the additive. For example, the calcium salt (for example, calcium nitrate) can be present in the set time control additive of the cement composition in an amount in the range of from about 1% by weight to about 16% by weight based on the total weight of the additive. For example, the calcium salt (for example, calcium nitrate) can be present in the set time control additive of the cement composition in an amount in the range of from about 8% by weight to about 12% by weight based on the total weight of the additive. For example, the calcium salt (for example, calcium nitrate) can be present in the set time control additive of the cement composition in an amount in the range of from about 3% by weight to about 4% by weight based on the total weight of the additive.

For example, the chloride salt (for example, sodium chloride) can be present in the set time control additive of the cement composition in an amount in the range of from about 1% by weight to about 20% by weight based on the total weight of the additive. For example, the chloride salt (for example, sodium chloride) can be present in the set time control additive of the cement composition in an amount in the range of from about 2% by weight to about 20% by weight based on the total weight of the additive. For example, the chloride salt (for example, sodium chloride) can be present in the set time control additive of the cement composition in an amount in the range of from about 1% by weight to about 16% by weight based on the total weight of the additive. For example, the chloride salt (for example, sodium chloride) can be present in the set time control additive of the cement composition in an amount in the range of from about 8% by weight to about 12% by weight based on the total weight of the additive. For example, the chloride salt (for example, sodium chloride) can be present in the set time control additive of the cement composition in an amount in the range of from about 3.5% by weight to about 4.5% by weight based on the total weight of the additive.

For example, the hydroxy carboxylic acid (for example, tartaric acid) can be present in the set time control additive of the cement composition in an amount in the range of from about 0.1% by weight to about 9% by weight based on the total weight of the additive. For example, the hydroxy carboxylic acid (for example, tartaric acid) can be present in the set time control additive of the cement composition in an amount in the range of from about 0.1% by weight to about 5% by weight based on the total weight of the additive. For example, the hydroxy carboxylic acid (for example, tartaric acid) can be present in the set time control additive of the cement composition in an amount in the range of from about 0.1% by weight to about 2.0% by weight based on the total weight of the additive.

For example, in one embodiment, the set time control additive comprises in the range of from about 2% by weight to about 20% by weight of said calcium salt (for example, calcium nitrate), in the range of from about 2% by weight to about 20% by weight of said chloride salt (for example, sodium chloride), and in the range of from about 0.1% by weight to about 5% by weight hydroxy carboxylic acid (for example, tartaric acid), the weight percentages being based on the total weight of the additive. For example, in another embodiment, the set time control additive comprises in the range of from about 3% by weight to about 4% by weight of said calcium salt (for example, calcium nitrate), in the range of from about 3.5% by weight to about 4.5% by weight of said chloride salt (for example, sodium chloride), and in the range of from about 0.1% by weight to about 2.0% by weight hydroxy carboxylic acid (for example, tartaric acid), the weight percentages being based on total weight of the additive.

As shown by the examples below, calcium salt (for example, calcium nitrate), the chloride salt (for example, sodium chloride) and the hydroxy carboxylic acid (for example, tartaric acid) of the set time control additive disclosed herein a achieve a synergistic effect in controlling the set time of the hydraulic cement composition disclosed herein when used in the method disclosed herein. The set time control additive has a dual nature, namely, it retards the cement slurry hydration and set time at the bottom of the cement column, while accelerating the cement slurry hydration and set time at the top of the cement column, thereby reducing the wait time before further well operations can be resumed. The set time of the composition at the bottom of the cement column is not significantly decreased.

For example, when used to form a long column cement slurry in a wellbore in which the temperature differential ($\Delta T$) between the top of cement temperature (TOCT) and the bottom hole static temperature (BHST) is large, the overall slurry can set in a reasonable time, even when the bottom hole static temperature (BHST) is greater than 220° F. (for example, 300° F.) and the temperature differential between the top of cement temperature (TOCT) and the bottom hole static temperature (BHST) is over 20° F. (for example, 120° F.). For example, the combination of components in the set time control additive act as an accelerator up to a temperature of approximately 220° F., and starts to act as retarder beyond 220° F.

For example, in one embodiment, the method of cementing a well disclosed herein is a method of cementing a casing in a wellbore comprising: (a) providing a hydraulic cement composition that includes a hydraulic cement, water, and a set time control additive; and (b) placing the cement composition in the well in a manner that forms a column of cement around the casing in the wellbore.

For example, in one embodiment, the method of cementing a well disclosed herein is a method of cementing a casing in a wellbore comprising: (a) providing a hydraulic cement composition that includes a hydraulic cement, water, and a set time control additive; and (b) placing the cement composition in the well in a manner that forms a column of cement around the casing in the wellbore. In this embodiment, the set time control additive includes calcium nitrate, sodium chloride, and tartaric acid.

For example, in one embodiment, the hydraulic cement composition disclosed herein comprises a hydraulic cement, water, and a set time control additive, the set time control additive including calcium nitrate, sodium chloride and tartaric acid.

For example, in one embodiment, the set time control additive disclosed herein comprises calcium nitrate, sodium chloride and tartaric acid.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments described herein. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit.

The exemplary binder compositions disclosed herein may directly or indirectly affect one or more components or pieces of equipment associated with the preparation, delivery, recapture, recycling, reuse, and/or disposal of the disclosed binder compositions. For example, the disclosed binder compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary binder compositions. The disclosed binder compositions may also directly or indirectly affect any transport or delivery equipment used to convey the binder compositions to a well site or downhole such as, for example, any transport vessels, conduits, pipelines, trucks, tubulars, and/or pipes used to compositionally move the binder compositions from one location to another, any pumps, compressors, or motors (e.g., topside or downhole) used to drive the binder compositions into motion, any valves or related joints used to regulate the pressure or flow rate of the binder compositions, and any sensors (i.e., pressure and temperature), gauges, and/or combinations thereof, and the like. The disclosed binder compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Referring now to FIG. 1, a system that may be used in the preparation of a cement composition in accordance with example embodiments will now be described. FIG. 1 illustrates a system 2 for preparation of a cement composition and delivery to a wellbore in accordance with certain embodiments. As shown, the cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the wellbore.

Figure 2A:
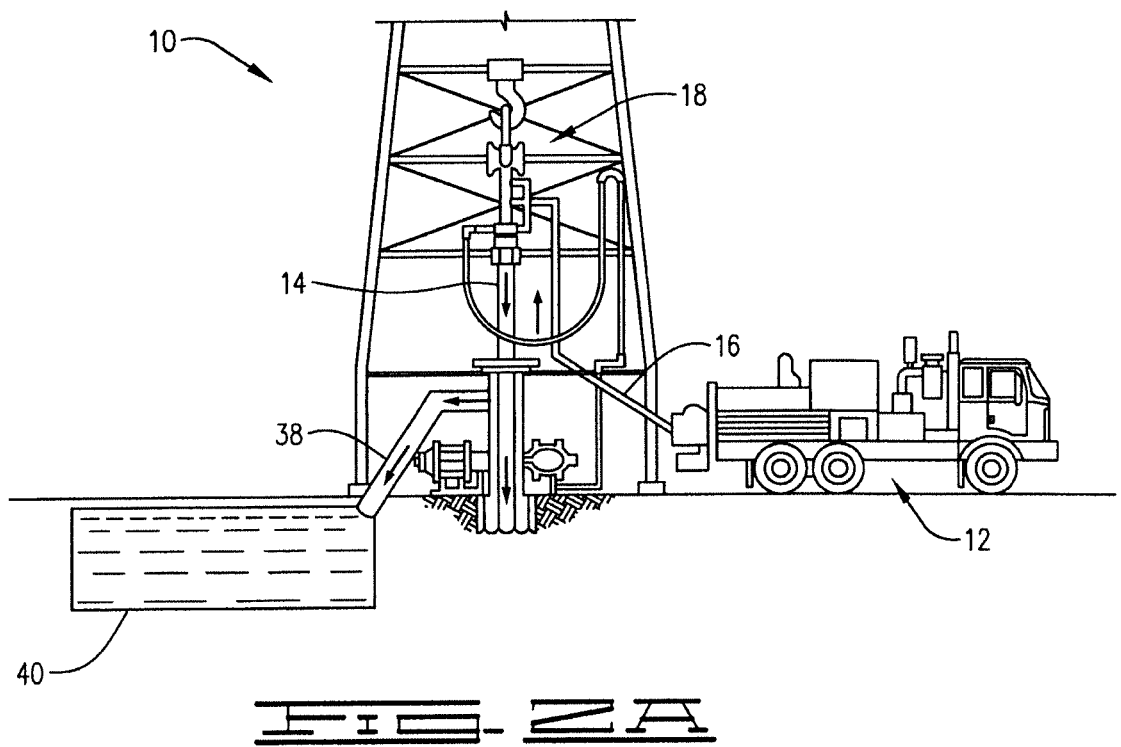
FIG. 2A illustrates surface equipment that may be used in placement of a cement composition in a wellbore in accordance with aspects of the present disclosure.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
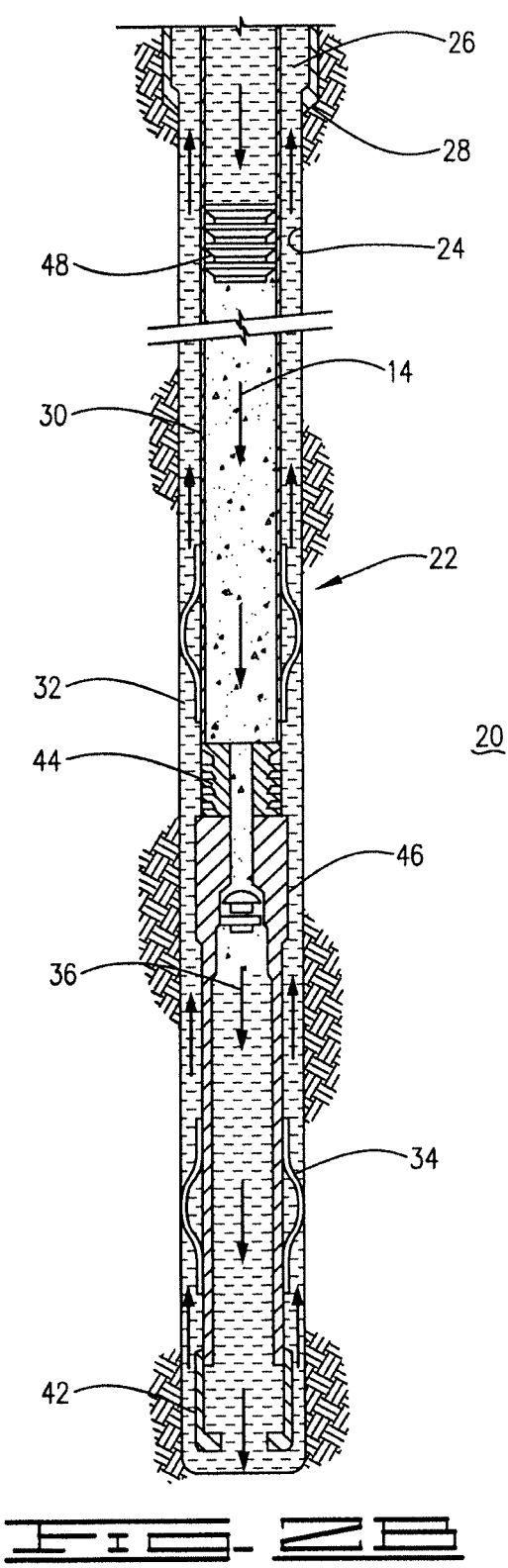
FIG. 2B illustrates placement of a cement composition into a wellbore annulus in accordance with aspects of the present disclosure.

Turning now to FIG. 2B, the cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiments, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.) shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids (such as drilling fluids and/or spacer fluids) 36 that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the wellbore 22 behind the binder composition 14. The top plug 48 may separate the cement composition 14 from a displacement fluid 50 and also push the cement composition 14 through the bottom plug 44.

EXAMPLES

The following examples illustrate specific embodiments consistent with the present disclosure but do not limit the scope of the disclosure or the appended claims. Concentrations and percentages with respect to a hydraulic cement composition or slurry are percent by weight, based on the weight of hydraulic cement in the composition or slurry ("% BWOC"), unless otherwise indicated.

Example 1

Dual Set Time Control of Disclosed Additive

A base hydraulic cement slurry having a density 15.8 lb/gal was designed and prepared using the components listed in Table 1 below.

TABLE 1

| Base Slurry | |
|---|---|
| Component | % BWOC[1] |
| Cement - Portland, Class G | 100 |
| Silica Flour[2] | 35 |
| A modified acrylamide copolymer[3] | 0.5 |
| A guar gum derivative[4] | 0.3 |
| A modified acrylamide copolymer[5] | 0.3 |
| Tartaric Acid | 0.3 |

[1]The percent by weight of the hydraulic cement in the additive.
[2]SSA-2 ™, a strength stabilizing agent marketed by Halliburton Energy Services, Inc.
[3]HALAD ®-344, a fluid loss additive marketed by Halliburton Energy Services, Inc.
[4]SA-541 ™, a suspending aid and free-water control agent marketed by Halliburton Energy Services, Inc.
[5]SCR-100 ™, a non-lignosulfonate cement retarder marketed by Halliburton Energy Services, Inc.

Next, the thickening times of the base hydraulic cement slurry were measured in the absence and presence of a mixture containing water, 4% BWOC calcium nitrate (Ca(NO$_3$)$_2$), and 4% BWOC sodium chloride (NaCl) (the "Mixture"). The measurements were carried out at several temperatures to understand the behavior of the Mixture and the additive disclosed herein at varying temperatures. The results shown are shown by Table 2a below. Thickening time charts of the hydraulic cement slurry in the presence of the Mixture at 220° F. and 300° F. are shown by Table 2b and Table 2c, respectively.

TABLE 2a

| Thickening Time With and Without the Mixture | | |
|---|---|---|
| Temperature (° F.) | Thickening Time Without the Mixture* (Hours) | Thickening Time With the Mixture* (Hours) |
| 220 | 16 | 13 |
| 240 | 9 | 10.2 |
| 300 | 2 | 5.75 |

*The Mixture consists of water, 4% by weight calcium nitrate, and 4% by weight sodium chloride.

TABLE 2b

| Thickening Time with the Mixture at 220° F. | | | |
|---|---|---|---|
| Elapsed Time (hh:mm:ss) | Slurry Temp (° F.) | Bc (Bc) | Pressure (PSI) |
| 00:00:00 | 78.01336 | 8.927634 | 5.425948 |
| 00:16:40 | 125.9109 | 13.41526 | 3592.207 |
| 01:06:41 | 219.7627 | 14.94472 | 8148.24 |
| 01:40:01 | 231.0294 | 5.373302 | 8158.311 |
| 02:13:21 | 219.4981 | 3.869084 | 8165.635 |
| 02:30:01 | 219.816 | 4.323385 | 8121.689 |
| 02:46:41 | 219.7169 | 3.896824 | 8116.807 |
| 03:03:21 | 219.9144 | 4.285178 | 8084.153 |
| 03:53:21 | 219.8326 | 3.125349 | 8102.769 |
| 04:10:01 | 219.8107 | 3.470262 | 8174.79 |
| 04:43:21 | 219.9994 | 3.759696 | 8159.531 |
| 05:00:01 | 219.7085 | 4.924758 | 8130.234 |
| 05:50:01 | 219.7954 | 2.98351 | 8066.453 |
| 06:06:41 | 219.8043 | 4.454232 | 8082.017 |

TABLE 2b-continued

| Thickening Time with the Mixture at 220° F. | | | |
|---|---|---|---|
| Elapsed Time (hh:mm:ss) | Slurry Temp (° F.) | Bc (Bc) | Pressure (PSI) |
| 06:56:41 | 219.6877 | 5.269148 | 8087.51 |
| 07:13:21 | 219.8365 | 4.777163 | 8082.627 |
| 07:46:41 | 219.6576 | 3.442522 | 8136.948 |
| 08:03:21 | 219.8273 | 4.973957 | 8247.727 |
| 08:20:01 | 219.8608 | 6.751385 | 8334.396 |
| 09:10:01 | 219.8223 | 5.652269 | 8124.436 |
| 09:43:21 | 219.7798 | 6.280859 | 8129.929 |
| 10:00:01 | 219.7906 | 3.486487 | 8091.477 |
| 10:50:01 | 219.7758 | 5.619295 | 8092.698 |
| 11:06:41 | 219.8093 | 6.242651 | 8182.114 |
| 11:56:41 | 219.7173 | 10.75549 | 8210.496 |
| 12:13:23 | 219.1987 | 34.78378 | 8038.376 |
| 12:16:39 | 219.3515 | 51.96433 | 7918.137 |
| 12:19:13 | 220.1851 | 61.80523 | 8083.542 |
| 12:20:13 | 220.3034 | 72.46867 | 8085.068 |
| 12:23:13 | 220.2594 | 108.8299 | 8163.804 |

*The Mixture consists of water, 4% by weight calcium nitrate, and 4% by weight sodium chloride.

TABLE 2c

| Thickening Time with the Mixture at 300° F. | | | |
|---|---|---|---|
| Elapsed Time (hh:mm:ss) | Slurry Temp (° F.) | Bc (Bc) | Pressure (PSI) |
| 00:00:01 | 80.58789 | 9.57581 | −15.6695 |
| 00:07:10 | 99.00002 | 8.664371 | 1196.866 |
| 00:15:30 | 129.6461 | 6.824547 | 2545.869 |
| 00:40:30 | 223.125 | 3.21348 | 6955.021 |
| 00:57:10 | 284.9262 | 1.792113 | 9695.617 |
| 01:05:30 | 306.4466 | 2.085995 | 9986.425 |
| 01:30:30 | 299.7564 | 3.248268 | 9891.21 |
| 01:55:30 | 300.0604 | 2.656861 | 9772.19 |
| 02:03:50 | 299.791 | 3.310557 | 10018.83 |
| 02:37:10 | 299.6262 | 3.28637 | 10095.41 |
| 02:53:50 | 299.4889 | 3.732328 | 9857.081 |
| 03:02:10 | 299.484 | 3.725371 | 9888.055 |
| 03:27:10 | 301.6028 | 6.032358 | 9928.493 |
| 03:35:30 | 299.9168 | 3.255226 | 9974.093 |
| 03:52:10 | 300.0473 | 7.145928 | 10039.2 |
| 04:00:30 | 299.5906 | 6.793403 | 10036.04 |
| 04:25:30 | 299.3294 | 6.025401 | 10095.12 |
| 04:42:10 | 299.1261 | 4.821712 | 10086.23 |
| 04:58:50 | 300.4041 | 3.355285 | 10044.36 |
| 05:07:10 | 299.7309 | 3.950338 | 10001.91 |
| 05:15:30 | 299.959 | 3.946693 | 10051.81 |
| 05:35:40 | 295.9193 | 17.96582 | 9963.769 |
| 05:36:20 | 296.887 | 29.74534 | 9997.896 |
| 05:36:50 | 297.6384 | 44.36616 | 9880.885 |
| 05:37:52 | 299.788 | 70.3112 | 9919.315 |
| 05:39:20 | 303.6794 | 84.57296 | 9964.056 |
| 05:40:10 | 306.1772 | 113.0912 | 9935.663 |

*The Mixture consists of water, 4% by weight calcium nitrate, and 4% by weight sodium chloride.

The results demonstrate the dual behavior of the disclosed additive, namely a calcium salt such as calcium nitrate, a chloride salt such as sodium chloride, and a hydroxy carboxylic acid such as tartaric acid. For example, the disclosed additive results in an acceleration of and decrease in the thickening time (and ultimate set time) up to 220° F., and a retardation of and increase in the thickening time (and general set time) beyond 220° F., in comparison to a slurry without the disclosed additive.

Example 2

Unique Behavior of Disclosed Additive

The effects of various salt-containing mixtures on the thickening time of the base hydraulic cement slurry set forth in Table 1 above were tested. The calcium salt was either calcium hydroxide (Ca(OH)$_2$) or calcium nitrate (Ca(NO$_3$)$_2$). When used, each salt was present in the mixture in an amount of 4% BWOC. The results are shown in Table 3 below.

TABLE 3

Thickening Time with Different Calcium Salts and/or Sodium Chloride

| Calcium Salt | Calcium Salt (% BWOC) | NaCl (% BWOC) | Thickening Time at 300° F. (h) |
|---|---|---|---|
| Ca(OH)$_2$ | — | 0 | 2:24 |
|  | 4 | 0 | 1:02 |
|  | 4 | 4% | 1:15 |
| Ca(NO$_3$)$_2$ | — | 4% | 2:30 |
|  | 4 | 0 | 2:00 |
|  | 4 | 4% | 5:45 |

As shown by Table 3, when the calcium salt was calcium hydroxide, it showed very little effect on the thickening time in the presence of sodium chloride. When the calcium salt was calcium nitrate, on the other hand, the thickening time of the cement slurry was significantly increased in the presence of sodium chloride. Thus, Table 3 confirms the synergistic effect of the additive disclosed herein (calcium nitrate, sodium chloride and tartaric acid) on the thickening time of a hydraulic cement slurry at 300° F.

Example 3

Effect of Sodium Chloride Concentration on Thickening Time

The effect of sodium chloride and the concentration thereof on the ability of the additive disclosed herein to impact the thickening time of the base hydraulic cement slurry set forth in Table 1 above at 300° F. was analyzed. In each test, a mixture containing water, 4% BWOC calcium nitrate, and up to 4% BWOC sodium chloride (if used), was added to the cement slurry. The results are shown in Table 4 below.

TABLE 4

Effect of NaCl Concentration on Thickening Time

| NaCl (% BWOC) | Ca(NO$_3$)$_2$ (% BWOC) | Thickening Time at 300° F. (h) |
|---|---|---|
| 0 | 4 | 2:00 |
| 3 | 4 | 3:35 |
| 4 | 4 | 5:45 |

Table 4 shows that the additive disclosed herein more signthcantly enhances the retardation of the set time and increase in the thickening time of a hydraulic cement slurry at 300° F. when the sodium chloride is present in the cement composition in an amount in the range of from about 3% BWOC to about 4% BWOC. The results show that an optimum concentration of the sodium chloride in the cement slurry is 4% BWOC.

From the results tabulated in Table 3 and Table 4, it can be concluded that optimum concentrations of calcium nitrate and sodium chloride in the disclosed additive (calcium nitrate, sodium chloride and tartaric acid) for achieving a synergistic effect in increasing the thickening time of a hydraulic cement slurry at higher temperatures are about 4% BWOC, for each component.

Example 4

Rapid Strength Development

In this example, the ability of the additive disclosed herein to act as a retarder in a hydraulic cement slurry at the bottom of a long cement column, and an accelerator in the hydraulic cement slurry at the top of the cement column, was tested. The following temperatures were involved in designing the hydraulic cement slurry:

a. the bottom hole circulation temperature (BHCT);
b. the bottom hole static temperature (BHST); and
c. the bottom of cement temperature (BOCT)
d. the top of cement temperature (TOCT)
e. the temperature differential (AT) between the top of cement temperature (TOCT) and the bottom hole static temperature (BHST).

In this example, it is assumed that the hydraulic cement slurry will be used to cement a casing in a well that extends from the top portion of the wellbore to the bottom portion of the wellbore. The bottom hole circulation temperature (BHCT) is the temperature to which the hydraulic cement slurry will be exposed as it circulates past the bottom of the casing, and is relevant to, for example, the thickening time of the cement slurry. The bottom hole static temperature (BHST) assumes a motionless condition where no fluids are circulating and cooling the wellbore, and is relevant to, for example, the strength development of the cement slurry. In this case, because the cement column will extend to the bottom portion of the well, the bottom of cement temperature (BOCT) is assumed to be the bottom hole static temperature (BHST). It is assumed that the hydraulic cement slurry will be placed over a large interval. As a result, the temperature differential (AT) is 120° F., which is very significant. The overall temperature profile, including the temperature differential, is illustrated by FIG. 3 of the drawings of this application.

Two separate hydraulic cement slurries, Slurry A and Slurry B, each having a density of 15.8 lb/gal, were designed and prepared using the components listed in Table 5 below. As shown by Table 5, Slurry A and Slurry B were the same, except Slurry B also included 4% BWOC calcium nitrate and 4% BWOC sodium chloride. Each slurry was designed to have a thickening time of six hours at a bottom hole circulation temperature (BHCT) of 300° F.

TABLE 5

Slurry Design and Results for UCA Test

| Component | Slurry-1 | Slurry-2 |
|---|---|---|
| Cement - Class G | 100% | 100% |
| Water | 6.3 gps | 6.3 gps |
| Silica Flour[1] | 35% | 35% |
| A guar gum derivative[2] | 0.3% | 0.3% |
| A modified acrylamide copolymer[3] | 0.5% | 0.5% |
| A modified acrylamide copolymer[4] | 0.5% | 0.3% |
| Tartaric Acid | 0.5% | 0.3% |
| Ca(NO$_3$)$_2$ | 0% | 4% |
| NaCl | 0% | 4% |
| Thickening time @ 300° F. | 6 h | 5:45 h |

TABLE 5-continued

Slurry Design and Results for UCA Test

| Component | Slurry-1 | Slurry-2 |
|---|---|---|
| 500 psi time @ 320° F. (BHST) | 16 h | 11 h |
| 500 psi time @ 200° F. (TOCT) | No strength up to 4 days | 16 h |

¹SSA-2 ™, a strength stabilizing agent marketed by Halliburton Energy Services, Inc.
²SA-541 ™, a suspending aid and free-water-control agent marketed by Halliburton Energy Services, Inc.
³HALAD ®-344, a fluid loss additive marketed by Halliburton Energy Services, Inc.
⁴SCR-100 ™, a non-lignosulfonate cement retarder marketed by Halliburton Energy Services, Inc.

Next, strength developments in both of the slurries were checked at the bottom hole static temperature (BHST) and top of cement temperature (TOCT) by using an ultrasonic cement analyzer ("UCA"), as known to those skilled in the art.

In carrying out the tests, each slurry was divided into two parts, and the strength development of each part was examined with the UCA. In connection with the first part, the temperature of the slurry was ramped up from the bottom hole circulation temperature (BHCT) to the bottom hole static temperature (BHST). In connection with the second part, the temperature of the slurry was ramped down from the bottom hole circulation temperature to the top of cement temperature (TOCT).

In carrying out the tests, it was observed that Slurry A (which did not include the calcium nitrate and sodium chloride) took 16 hours to achieve a 500 psi strength at the bottom hole static temperature (BHST). However, Slurry A did not develop any strength after 4 days at the top of cement temperature (TOCT). Conversely, Slurry B (which did include the calcium nitrate and sodium chloride) showed a strength development of 500 psi at both the bottom hole static temperature (BHST) and the top of cement temperature (TOCT) in 11 hours and 16 hours respectively.

For example, the results for Slurry B are shown by Table 6 below.

TABLE 6

UCA chart of Slurry B at TOCT (200° F.)

| Elapsed Time (hh:mm:ss) | Temperature (° F.) | Transit Time (μs) | Compressive Strength (PSI) |
|---|---|---|---|
| 0:00:01 | 75.2 | 32.92 | 0 |
| 1:40:08 | 241.4 | 33.38 | 0 |
| 2:46:52 | 272.1 | 34.44917 | 0 |
| 3:21:07 | 247 | 33.9 | 0 |
| 4:27:51 | 205.7 | 33.27167 | 0 |
| 5:01:54 | 192 | 33.0525 | 0 |
| 6:42:00 | 198.4 | 33.13083 | 0 |
| 7:48:44 | 199.7 | 33.18167 | 0 |
| 8:55:28 | 200 | 33.35917 | 0 |
| 9:28:51 | 199.8 | 33.4 | 0 |
| 10:02:13 | 200 | 33.4275 | 0 |
| 11:08:56 | 200 | 33.45583 | 0 |
| 12:15:40 | 200.1 | 33.43167 | 0 |
| 13:22:24 | 200.1 | 33.16417 | 0 |
| 13:55:46 | 200.1 | 32.75583 | 0 |
| 14:29:09 | 200.1 | 31.93667 | 30.48306 |
| 15:02:32 | 200 | 30.4925 | 87.23234 |
| 15:35:53 | 200.1 | 27.74417 | 254.1015 |
| 16:09:15 | 200 | 25.0775 | 549.2591 |
| 16:42:38 | 199.9 | 23.5125 | 836.2349 |
| 17:49:21 | 199.9 | 22.21083 | 1184.2 |
| 18:22:43 | 200 | 21.89667 | 1288.787 |
| 18:56:06 | 200 | 21.68083 | 1366.287 |
| 19:29:28 | 200 | 21.51 | 1431.159 |
| 20:02:50 | 199.9 | 21.37083 | 1486.454 |
| 20:36:12 | 200 | 21.24667 | 1537.739 |
| 21:09:35 | 199.9 | 21.14917 | 1579.354 |
| 22:16:19 | 200 | 20.96833 | 1659.818 |
| 23:23:03 | 199.9 | 20.83583 | 1721.617 |
| 23:56:26 | 200 | 20.765 | 1755.685 |
| 25:03:10 | 199.9 | 20.655 | 1810.069 |
| 25:57:33 | 200.2 | 20.57583 | 1850.358 |

Thus, at a bottom hole circulation temperature (BHCT) of greater than 220° F., the additive disclosed herein will act as a retarder; however, when the slurry reaches the top of cement temperature (TOCT), the additive acts as an accelerator and provides rapid strength development. The thickening time at the bottom hole static temperature (BHST) when the calcium nitrate and sodium chloride were included was almost the same as the thickening time at the bottom hole static temperature (BHST) when the calcium nitrate and sodium chloride were not included.

Therefore, the present treatment additives and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing a well, comprising:
    (a) providing a hydraulic cement composition that includes a Portland cement, water, and a set time control additive, said set time control additive including:
    a water soluble calcium salt;
    a water soluble chloride salt; and
    a hydroxy carboxylic acid; and
    (b) placing said cement composition in the well so as to form a column of cement having a top of cement temperature up to 220° F. and a bottom hole static temperature of greater than 220° F., and wherein:
    said calcium salt is present in said hydraulic cement composition in an amount in the range of from about 1% to about 20% by weight based on the weight of said Portland cement in said hydraulic cement composition;

said chloride salt is present in said set time control additive in an amount in the range of from about 1% to about 20% by weight based on the weight of said Portland cement in said hydraulic cement composition; and said hydroxy carboxylic acid is present in said set time control additive in an amount in the range of from about 0.1% to about 20% by weight based on the weight of said Portland cement in said hydraulic cement composition;

such that the set time of the hydraulic cement composition is accelerated at the top of cement temperature and the set time of the hydraulic cement composition is retarded at the bottom hole static temperature.

2. The method of claim 1, wherein prior to (b) placing said cement composition in said well, well operations are ceased, and wherein said method further comprises: (c) allowing said cement composition to set before well operations are resumed.

3. The method of claim 1, wherein said method is a method of cementing a pipe string in a wellbore, and said cement composition is placed in said well in a manner that forms the column of cement around said pipe string in said wellbore.

4. The method of claim 3, wherein said method is a primary cementing operation, and said pipe string is a casing being cemented in place in said well.

5. The method of claim 1, wherein said hydraulic cement composition is provided by mixing said Portland cement, water and additive together, and wherein said components of said additive are blended together prior to mixing said additive with said Portland cement and said water.

6. The method of claim 1, wherein there is a temperature differential between the top of cement temperature and the bottom hole static temperature of more than 20° F.

7. The method of claim 1, wherein said calcium salt is present in said hydraulic cement composition in an amount in the range of from about 3% to about 10% by weight based on the weight of said Portland cement in said hydraulic cement composition.

8. The method of claim 1, wherein said chloride salt is present in said set time control additive in an amount in the range of from about 3% to about 10% by weight based on the weight of said Portland cement in said hydraulic cement composition.

9. The method of claim 1, wherein said hydroxy carboxylic acid is present in said set time control additive in an amount in the range of from about 0.1% to about 5% by weight based on the weight of said Portland cement in said hydraulic cement composition.

10. The method of claim 1, wherein said water soluble calcium salt is calcium nitrate.

11. The method of claim 1, wherein said water soluble chloride salt is sodium chloride.

12. The method of claim 1, wherein said hydroxy carboxylic acid is tartaric acid.

13. The method of claim 1, wherein the cement composition is introduced into the wellbore using one or more pumps.

14. The method of claim 1, wherein:

said calcium salt is present in said hydraulic cement composition in an amount in the range of from about 3% to about 10% by weight based on the weight of said Portland cement in said hydraulic cement composition;

said chloride salt is present in said set time control additive in an amount in the range of from about 3% to about 10% by weight based on the weight of said Portland cement in said hydraulic cement composition; and said hydroxy carboxylic acid is present in said set time control additive in an amount in the range of from about 0.1% to about 5% by weight based on the weight of said Portland cement in said hydraulic cement composition.

15. The method of claim 14, wherein there is a temperature differential between the top of cement temperature and the bottom hole static temperature of more than 20° F.

16. The method of claim 15, wherein: said water soluble calcium salt is calcium nitrate; said water soluble chloride salt is sodium chloride; and said hydroxy carboxylic acid is tartaric acid.

17. The method of claim 16, wherein prior to (b) placing said cement composition in said well, well operations are ceased, and wherein said method further comprises: (c) allowing said cement composition to set before well operations are resumed.

18. The method of claim 17, wherein said method is a method of cementing a pipe string in a wellbore, and said cement composition is placed in said well in a manner that forms the column of cement around said pipe string in said wellbore.

19. The method of claim 18, wherein said method is a primary cementing operation, and said pipe string is a casing being cemented in place in said well.

20. The method of claim 19, wherein said hydraulic cement composition is provided by mixing said Portland cement composition, water and additive together, and wherein said components of said additive are blended together prior to mixing said additive with said Portland cement composition and said water.

\* \* \* \* \*